United States Patent
Horspool et al.

(10) Patent No.: US 9,606,915 B2
(45) Date of Patent: Mar. 28, 2017

(54) POOL LEVEL GARBAGE COLLECTION AND WEAR LEVELING OF SOLID STATE DEVICES

(71) Applicant: OCZ Storage Solutions, Inc., San Jose, CA (US)

(72) Inventors: Nigel D. Horspool, Great Missenden (GB); Yaron Klein, Raanana (IL)

(73) Assignee: Toshiba Corporation, Tokyo (JP)

( * ) Notice: Subject to any disclaimer, the term of this patent is extended or adjusted under 35 U.S.C. 154(b) by 34 days.

(21) Appl. No.: 14/823,784

(22) Filed: Aug. 11, 2015

(65) Prior Publication Data

US 2017/0046256 A1    Feb. 16, 2017

(51) Int. Cl.
  *G06F 12/02*  (2006.01)
  *G06F 3/06*  (2006.01)

(52) U.S. Cl.
  CPC ........ *G06F 12/0253* (2013.01); *G06F 3/0608* (2013.01); *G06F 3/0649* (2013.01); *G06F 3/0652* (2013.01); *G06F 3/0659* (2013.01); *G06F 3/0688* (2013.01); *G06F 3/0689* (2013.01); *G06F 12/0246* (2013.01); *G06F 2212/1044* (2013.01); *G06F 2212/7205* (2013.01)

(58) Field of Classification Search
  CPC .................. G06F 12/0246; G06F 12/0253
  USPC .................................. 711/103, 155
  See application file for complete search history.

(56) References Cited

U.S. PATENT DOCUMENTS

| | | | |
|---|---|---|---|
| 2012/0198128 A1* | 8/2012 | Van Aken | 711/103 |
| 2014/0122774 A1* | 5/2014 | Xian et al. | 711/103 |
| 2014/0365719 A1* | 12/2014 | Kuzmin et al. | 711/103 |
| 2015/0026449 A1* | 1/2015 | Heo et al. | 713/2 |
| 2015/0222705 A1* | 8/2015 | Stephens | 709/214 |

\* cited by examiner

*Primary Examiner* — Than Nguyen
(74) *Attorney, Agent, or Firm* — White & Case LLP

(57) ABSTRACT

The operation of a pool of solid state drives is orchestrated to manage garbage collection and wear leveling. Each individual solid state drive is operated in either an Active Mode in which I/O commands are processed or in a Maintenance Mode in which garbage collection is performed and no I/O commands are processed. The selection of solid state drives in the Active Mode is further selected to achieve wear leveling over the pool of solid state drives. A virtualization layer provides dynamic mapping of virtual volume addresses to physical solid state drives.

36 Claims, 15 Drawing Sheets

POOL LEVEL GARBAGE COLLECTION AND WEAR LEVELING OF SOLID STATE DEVICES

FIELD OF THE INVENTION

Embodiments of the present invention are generally related to garbage collection and wear leveling of one or more solid state devices. More particularly, embodiments of the present invention are directed to management of a plurality of solid state devices (SSD) while garbage collection and wear leveling are handled at a pool level.

BACKGROUND OF THE INVENTION

Nonvolatile memory devices, such as flash memory devices, are widely used in a variety of applications such as universal serial bus (USB) drives, digital cameras, mobile phones, smart phones, tablet personal computers (PCs), memory cards, and solid state drives (SSDs), to name but a few.

A flash memory device is typically organized into a plurality of memory blocks, pages, and memory cells, where each of the memory blocks comprises a plurality of pages, and each of the pages comprises a plurality of memory cells. In general, each of the memory cells may be a single-level cell (SLC) or a multi-level cell (MLC). An SLC is a memory cell that stores one bit of information, and an MLC is a memory cell that stores multiple bits of information.

In a typical flash memory device, program operations are performed in units of pages, and erase operations are performed in units of memory blocks. Where a flash memory device receives a program command to replace a page of current data with new data, the flash memory device typically stores the new data in a page having an erased state, and it invalidates the current data. In other words, the flash memory device does not overwrite the current data at its current page location, but merely invalidates the current data and stores the new data in another page.

As the flash memory device continues to operate, invalid pages tend to accumulate in memory blocks that have not been recently erased. The accumulation of invalid pages generally reduces the amount of usable storage space in the flash memory device, and it can also slow down operation of the flash memory device. Accordingly, so-called garbage collection operations may be performed on memory blocks containing significant numbers of invalid pages to reclaim some of the storage space. A typical garbage collection operation involves moving any remaining valid data from a target memory block to a different memory block and then erasing the target memory block. Garbage collection operations are typically performed automatically as part of memory management.

However, a result of the garbage collection operation is that incoming I/O read/write commands are stalled. During a garbage collection operation, the copying of valid pages to new locations and block erasures degrades the overall performance and hence reduces the workload potential.

Another difference between hard disk drives (HDD) and flash based storage (SSD) relates to the limited number of write cycles in a flash media. After multiple writes to a cell, it will inadvertently suffer from endurance problems caused by the breakdown of the oxide layer. A second problem with respect to NAND flash is the limited data retention. Whereas HDDs retain data practically unlimited, NAND flash data are subjected to leakage currents causing the programming charge to dissipate and hence resulting in data loss. With smaller process geometry, this retention problem is becoming increasingly important and requires constant scrubbing of data in order to counteract increasing failure rates by refreshing them to a new physical location.

There is interest in the field in providing improved control over garbage collection. For example, the InterNational Committee on Information Technology Standards (INCITS) T10 technical committee has included "Storage Intelligence Command" set into its Storage Primary Command (SPC). Version SPC-5 of the command set provides a mechanism to control (among other things) garbage collection operation in an SSD. The command set adds to SCSI mechanism methods to control the operation of the garbage collection—Start and Stop. Furthermore, it provides methods to retrieve additional SSD related information such as the number of free pages.

However, there are still many practical problems in garbage collection, particularly in Redundant Array Of Independent Disks (RAID) architecture using SSD devices. In particular, there is a lack of commercially practical solutions to manage garbage collection and wear leveling in a pool of SSDs.

SUMMARY OF THE INVENTION

The operation of a set of solid state drives (SSDs) is orchestrated to manage garbage collection and wear leveling. The SSD devices may be operated as a storage pool. In one embodiment, each individual solid state drive is operated in either an Active Mode in which I/O commands are processed or in a Maintenance Mode in which garbage collection is performed and no I/O commands are processed. The selection of solid state drives in the Active Mode is further selected to achieve wear leveling over the pool of solid state drives. In one embodiment a virtualization layer provides dynamic mapping of virtual volume addresses to physical solid state drives.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION

Selected embodiments of the inventive concept are described below with reference to the accompanying drawings. These embodiments are presented as teaching examples and should not be construed to limit the scope of the inventive concept.

Figure 1:
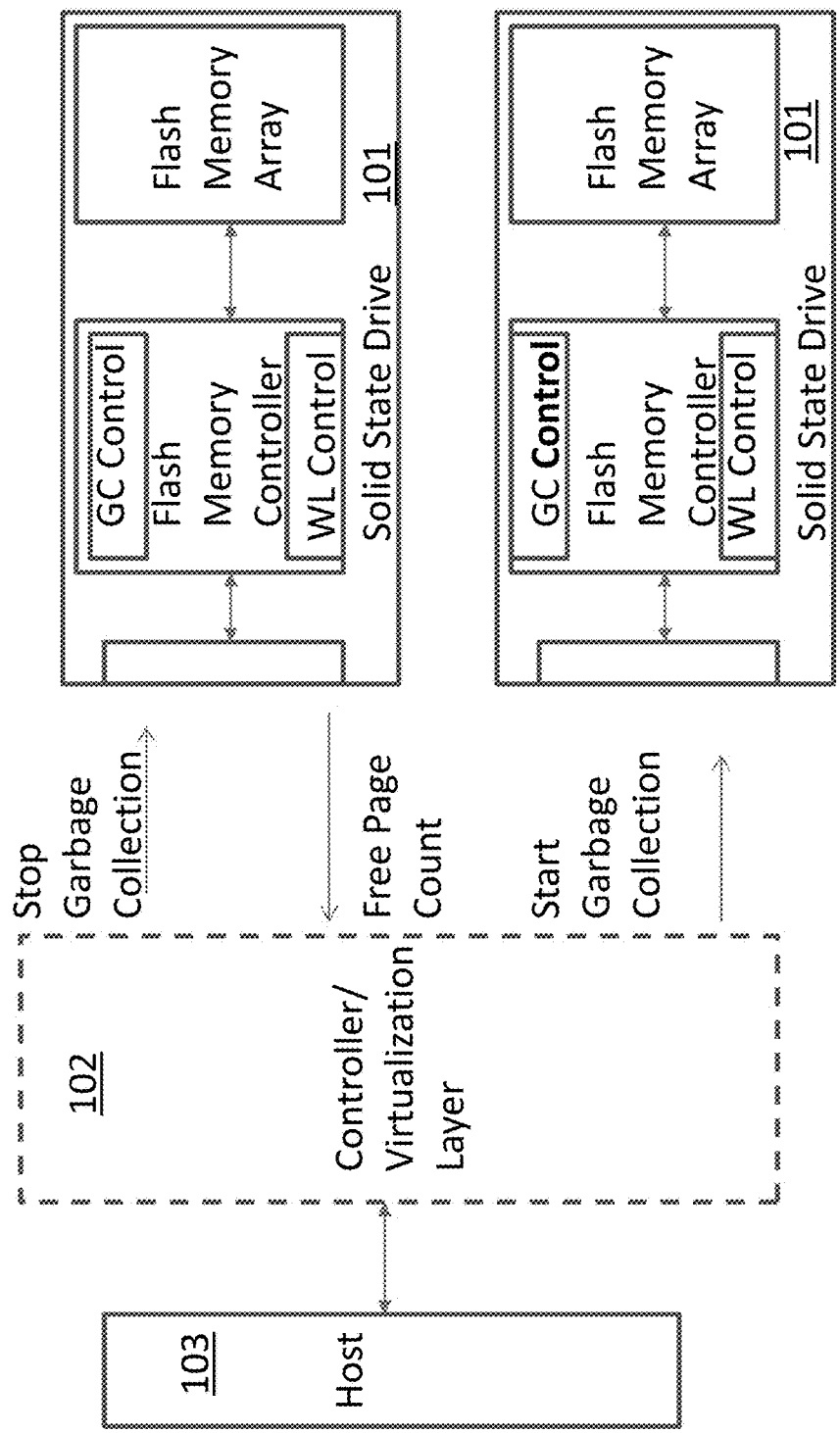
FIG. 1 is a block diagram of a storage system including the orchestration of garbage collection and wear leveling in a plurality of SSDs in accordance with an embodiment of the present invention.

FIG. 1 is a block diagram illustrating a system having a pool of at least two solid state drives (SSDs) 101. Each SSD includes a flash memory controller, flash memory array, and a host interface. Each SSD flash memory controller includes a GC control module to permit the SDD device to respond to command primitives related to garbage collection (GC) control and orchestration. The GC control module may, for example, be implemented in firmware. Additionally, each SSD device may include a wear leveling (WL) module to report on device endurance.

A host computer 103 issues I/O read and write commands. In principal the host computer may directly manage orchestration of the operation of the SSDs. However, in one embodiment, a pool controller 102 is provided to facilitate orchestration of the operation of the pool of SSDs and perform at least part of the orchestration of the SSD operations. The pool controller 102 may be implemented in firmware or include a processor and software. A virtualization layer may be included to perform dynamic mapping between a virtual address space and individual SSDs 101. A rule base may be provided to make decisions on which SSD to read/write and makes decision on which SSDs to start or stop GC based on information such as information on free pages, an erase count, and GC status of each device.

In one embodiment, a primitive function in each SSD device 101 is used to stop or pause the background garbage collection 101 of an individual SSD device and to resume the background garbage collection operation 101 in the SSD device. Additionally, the number of free pages available can be retrieved via the primitive function.

The primitive functions can be implemented via vendor specific commands. The vendor specific commands are commands that extend a standardized set of commands of a storage protocol to allow individual vendors to implement additional functions which may be unique to the vendors' products, e.g. commands using opcodes C0h to FFh in the SCSI protocol) of any storage transport protocol. Alternatively, the primitive function can be based on the "Storage Intelligence" command set in T10's SPC-5.

Figure 2A:
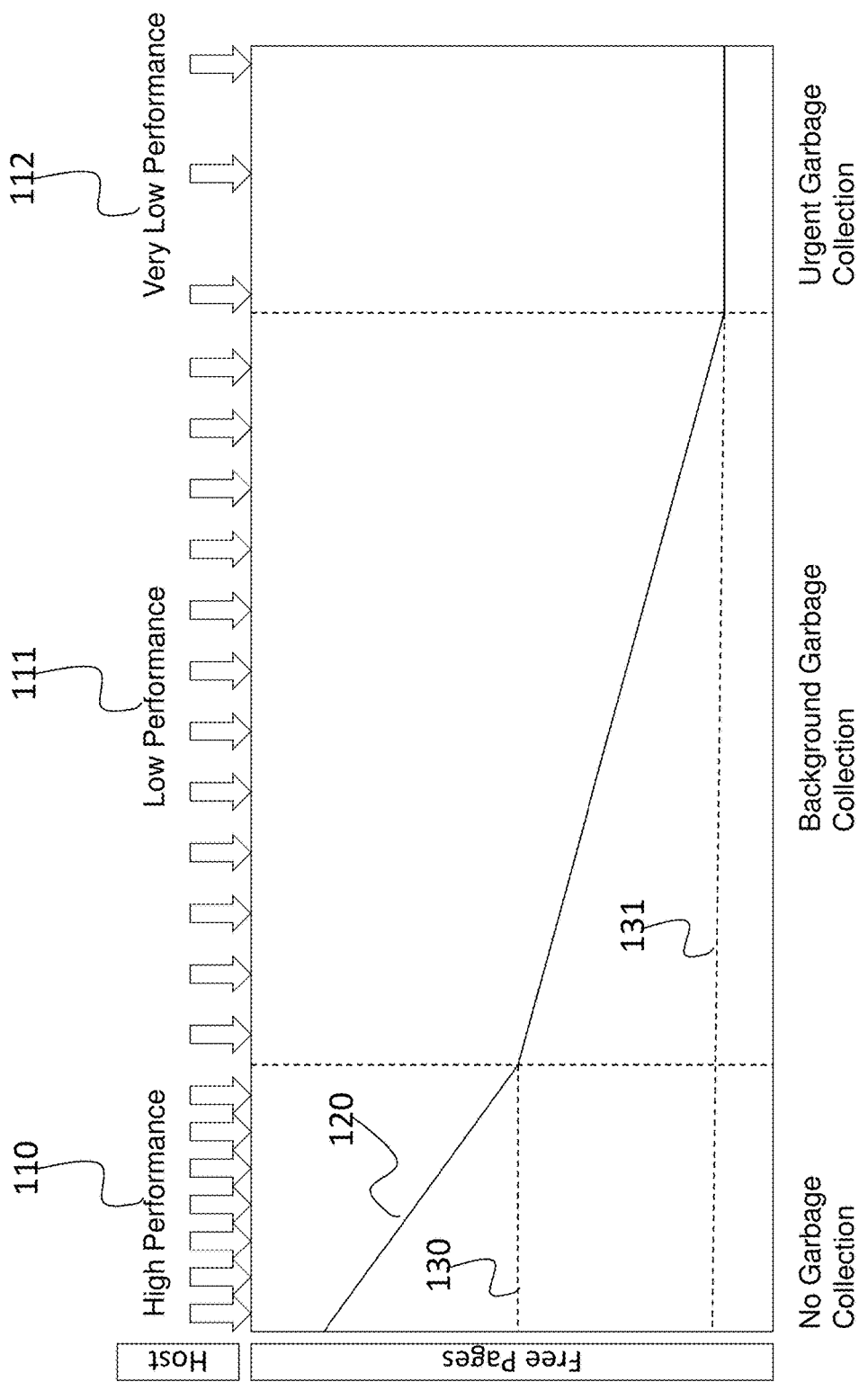
FIG. 2A is diagram illustrating the behavior of an individual SSD without orchestrated garbage collection.

In one embodiment, garbage collection is orchestrated over the pool of SSDs to improve performance and operation of the pool of SSDs. Additionally, wear leveling may be coordinated to balance wear across the SSDs FIG. 2A is a plot illustrating the behavior of an individual SSD without orchestration of garbage collection. Zone 110 is a high performance zone. When the SSD is empty (e.g., after a secure erase or with a new SSD) there are no "dirty" (invalid) pages and there is no garbage collection operation. As a result, the SSD is in a high performance zone.

Zone 111 is a low performance zone. Once the number of free pages (denoted free page count line 120) in the device drops below some threshold 130, the device starts a process of background garbage collection. As the SSD device has to conduct garbage collection the performance is reduced in Zone 111. This is because garbage collection is a process that involves an operation of copying remaining valid pages in a block with invalid pages to pages in new (erased) blocks and erasure of dirty blocks. Depending on various factors, such as the number of reads and writes being performed, the number of free pages may continue to decline.

Zone 112 is a very low performance zone. If the free pages count line drops below a lower watermark threshold 131, the SSD enters an urgent garbage collection mode and forces evacuation of blocks. As a result, the performance degrades to a very low performance level.

Figure 2B:
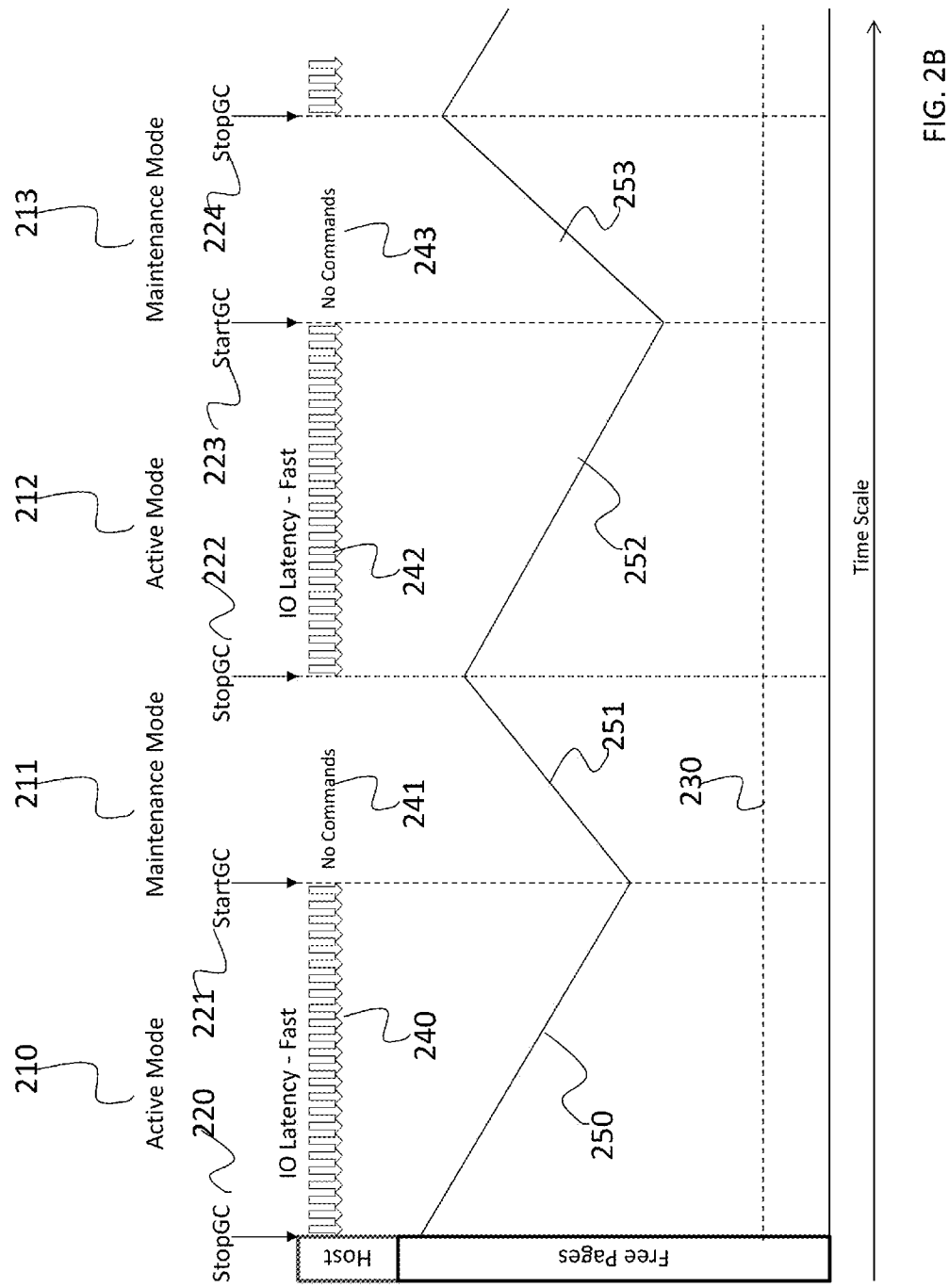
FIG. 2B is a diagram illustrating the behavior of an individual SSD with orchestrated garbage collection in accordance with an embodiment of the present invention.

FIG. 2B is a plot illustrating the behavior of an individual SSD device with garbage collection control. Upon a fresh start (e.g., after a secure erase of a device with existing data or with a new device), the number of free pages is high (at its maximum with a new or erased device). A Stop Garbage Collection command 220 is issued (e.g., via the host or the pool controller) to the SSD device and the host starts sending read/write I/O commands to it. This is an "Active Mode" in which the individual SSD device processes incoming write commands. No background garbage collection process is conducted in the Active Mode. As a result the performance 240 in the Active Mode of the device is high. However, as time progresses incoming write commands will consume free pages and may also cause dirty pages; hence the number of free pages 250 reduces.

A decision is made to enter a Maintenance Mode 211. The decision may be based on various factors, such as monitoring the number of free pages, in combination with other consideration, to make a decision to enter a "Maintenance Mode" 211 for the individual SSD device. This should be done prior to the number of free pages reaching the urgent threshold 230. In the Maintenance Mode a Start Garbage Collection command 221 is issued and the SSD device in response starts a garbage collection process and evacuates dirty pages. As a result, the number of free pages 251 increases. During the Maintenance Mode 211, no read/write I/O commands are issued to the SSD. As no read/write I/O commands are being processed by the SSD in the Maintenance Mode, the efficiency of the garbage collection process is high, as can be seen by the high rate at which the free pages increases.

The number of free pages in the device 251 is monitored. After it reaches a sufficient value, a decision is made to return to the Active Mode 212 again via issuing of a Stop Garbage Collection 222 command. As a result of IO commands being issued 242, the number of free pages 252 decreases. Then a Start Garbage Collection command 223 is issued and the SSD device in response enters Maintenance Mode 213 and starts a garbage collection process and evacuates dirty pages. As a result, the number of free pages 253 increases again. This life cycle continues, switching the device alternately from "Active Mode" to "Maintenance Mode". During Active Mode periods 210 and 212, IO commands may be issued by the host with a fast response (low latency) 240, 242. During Maintenance Mode periods 211 and 213, no IO commands are issued 241, 243. In a pool of SSDs, decisions on whether or not individual SSDs are to process I/O commands can also take into consideration wear leveling, high availability, and other considerations.

In one embodiment, the orchestration includes the prioritization of read commands over write commands in individual modes of operation of a SSD. In one alternate embodiment read commands (but no write commands) are permitted during the Maintenance Mode.

Figure 3:
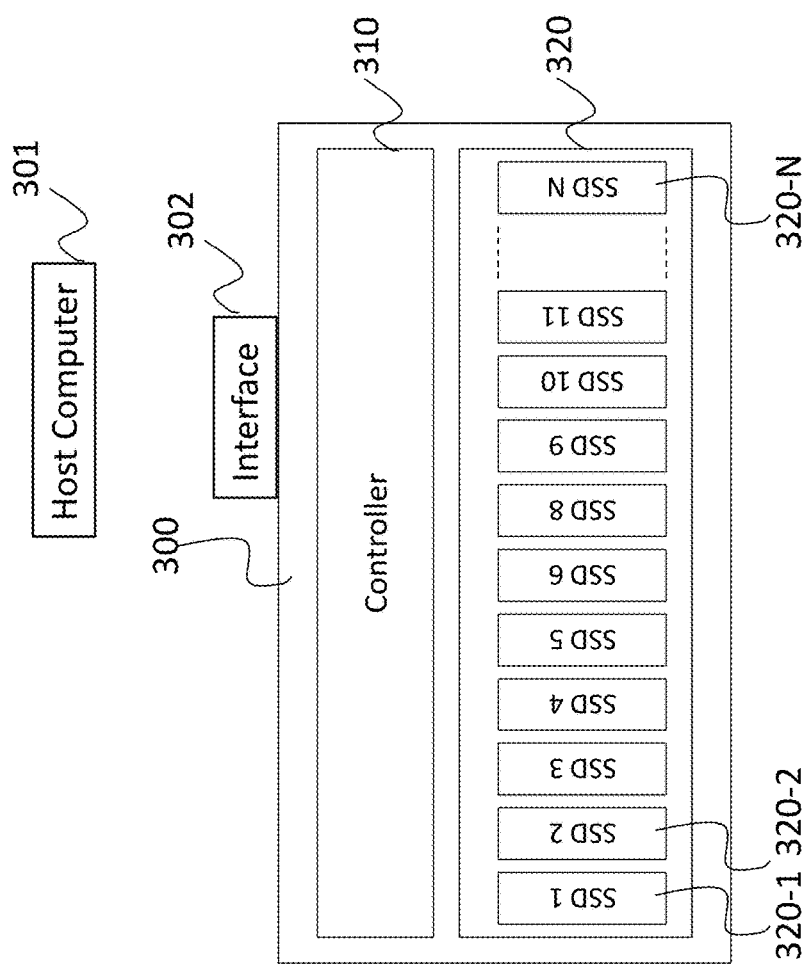
FIG. 3 is a diagram illustrating an example of a SSD pool within a storage appliance or a storage server in accordance with an embodiment of the present invention.

FIG. 3 is a block diagram of a system illustrating an example of a pool of N SSDs in accordance with an embodiment of the present invention. An enclosure 300 contains plurality of SSDs 320. An interface 302 is provided to access external clients, such as a host computer 301. A controller 310 may include firmware or software. The controller 310 may exposes volumes to external clients (e.g., via iSCSI or Fibre Channel interface). The controller 310 reads and writes to the SSDs 320 in order to maintain these volumes. As examples, the controller 310 may include a processor and software to implement a RAID functionality (e.g., RAID10, RAID5, etc.) or a virtualization layer (e.g., Thin Provisioning).

As illustrative commercial applications, a pool of N SSDs 320 can be used in a flash storage appliance. According to another embodiment, the pool of N SSDs can reside in a storage server, while the controller 310 is a software layer. As an example the controller may include a software layer, such as Linux LVM, that provides volumes to upper layers within the server.

Figure 4:
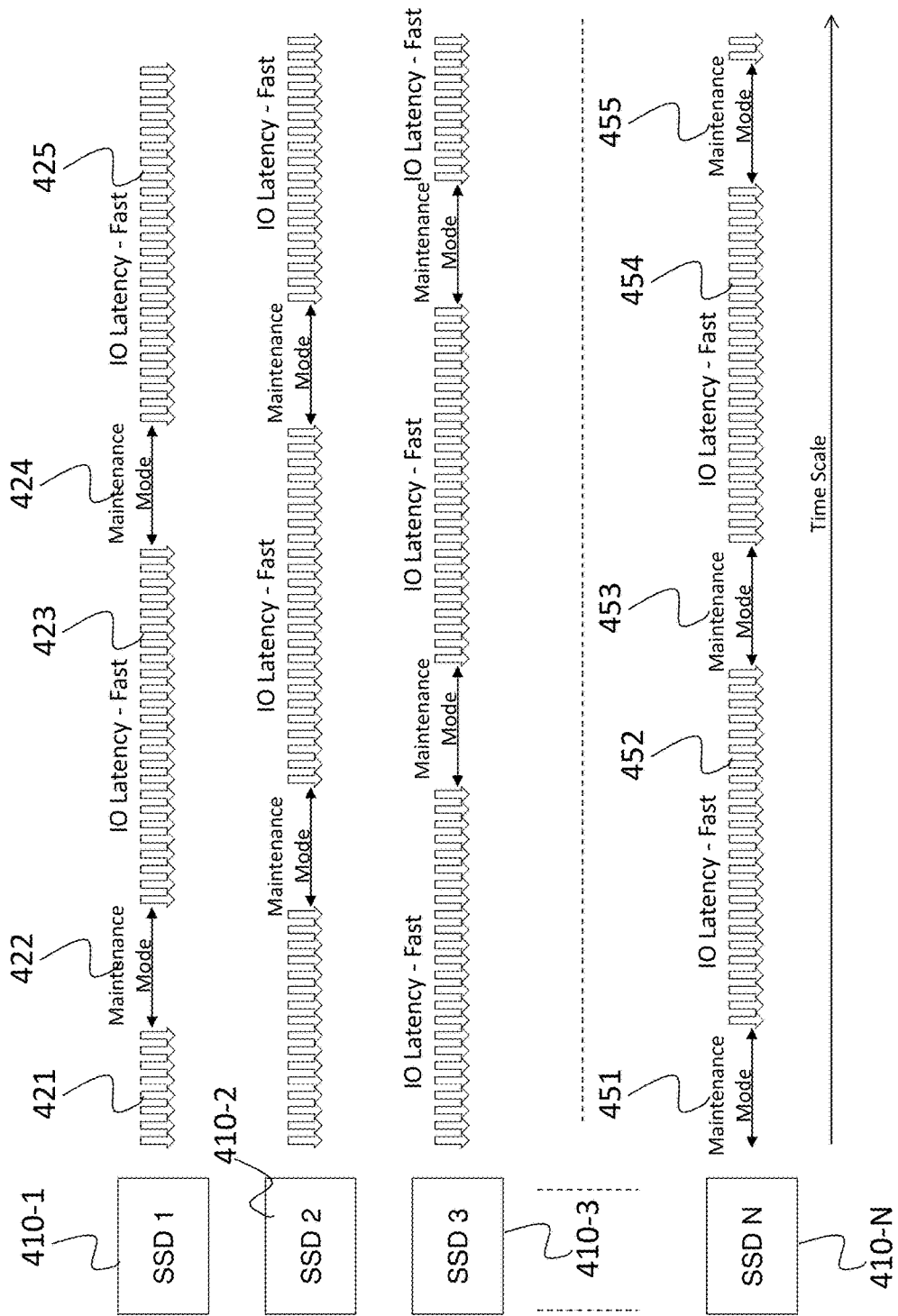
FIG. 4 illustrates simultaneous behavior of a plurality of SSDs operating as a storage pool with garbage collection control in accordance with an embodiment of the present invention.

FIG. 4 illustrates the orchestration of a lifecycle of a pool of N SSD devices over time with garbage collection control in accordance with an embodiment of the present invention. The pool of N SSD devices may be part of a storage array 300, such as in a storage appliance or storage server. Due to the fact that in a "Maintenance Mode" the SSD device does not serve incoming read/write commands, there is a need in a pool or storage array to schedule the mode of operation in the individual SSD devices and to issue read/write commands from the host to SSDs that are in the Active Mode.

As can be seen in FIG. 4, at start SSD N 410-N is in "Maintenance Mode" 451 while SSD 1 410-1, SSD 2 410-2 and SSD 3 410-3 are in Active Mode. Hence, the read/write I/O commands of the host are only sent to the SSDs in Active Mode at this time.

After its "Active Mode" period 421, SSD 1 410-1 switches to "Maintenance Mode" 422 and SSDN 410-N switches from "Maintenance Mode" 451 to "Active Mode" 452. Thus, now SSD1 410-1 stops being issued with read/write I/O commands by the host while SSDN 410-N may now be issued with read/write I/O commands having left 'Maintenance Mode' and entered 'Active Mode.'

As can be seen in FIG. 4, the orchestration may be selected so that at any one give time there are always some SSDs available to process I/O commands that in a high performance mode of operation. The orchestration may also include one or more rules for the switching from Active Mode to Maintenance Mode to ensure that a minimum number of active SSDs are available at a given time. In the example of FIG. 4 the switching is staggered in a rotation. Thus, SSD 410-1 switches back to Active Mode 423 when SSD 410-2 begins Maintenance Mode until SSD 410-N eventually has its turn to switch back to Maintenance Mode 453, at the end of which when it transfers to Active Mode 454, SSD 410-1 switches to Maintenance Mode 424. Then SSD 410-1 switches back to Active Mode 425 when SSD 410-2 begins Maintenance Mode and each SSD in turn switches to Maintenance Mode and eventually SSD 410-N switches to Mainenance Mode again 455. However, more generally other rules could be employed to orchestrate which SSD devices are in the Active Mode and which are in the Maintenance Mode.

For example, in one embodiment the rules are applied in a pool of SSDs operating in a RAID 1 or RAID 0+1 modes, where SSDs are operating in mirrored pairs. In this case, operation of the SSDs is coordinated so that at least one SSD of the pair is always operating in Active Mode if the other is in Maintenance Mode. This ensures that the combination of both drives operating in Maintenance Mode will not occur, only Active-Active and Active-Maintenance combinations are possible. When reading the data, the data is always read from an Active Mode SSD. When writing data, the operation of the SSDs is coordinated to first write the data to an Active Mode SSD, but to delay writing a Maintenance Mode SSDs in the pair until it resume operation in Active Mode. In contrast, if RAID mirroring was performed without this orchestration, increased latency for read/write operations would occur if both SSDs were in Maintenance Mode and performing garbage collection.

In another embodiment, a rules are applied to orchestrate the SSDs when the pool is employing erasure codes to store data in the pool. With erasure coding, a data object to be stored is encoded and then split into a number of chunks, n, being the number of SSDs in the pool. That is, the data and erasure codes are spread out over n, SSDs, where each of the n SSDs stores one of the n chunks. However, the data object can be successfully decoded by reading any smaller number of chunks, k, where k<n. Hence, in one implementation, the orchestration of SSDs ensures that a rule is obeyed whereby, at any time, only a maximum of n−k SSDs are operating in Maintenance Mode, such that at least k SSDs are always in Active Mode. This rule means the data can always be read with no increased latency due to the reading of a data chunk from an SSD in Maintenance Mode. In the case of writing data objects, all n SSDs must be written, although the writing of any SSDs in Maintenance Mode can be delayed until they return to Active Mode. Data may still be instantly read back after writing only k SSDs, as those k SSDs are sufficient to recover the data.

Endurance and wear leveling are additional considerations in the management of a pool of SSDs and selecting which SSDs are used at any one particular time to process an I/O command from a host. As the number of Program/Erase (P/E) cycles per memory cell in a flash memory device is limited, the SSD controller tries to average the P/E cycle ratios across all the blocks in a flash memory device, thereby increasing the endurance of the SSD which will start to be limited in operation when the P/E cycle ratio of any blocks reaches the endurance limit. This operation is referred as Wear Leveling and currently handled at a flash device level by the SSD controller. In accordance with an embodiment of the present invention, the selection of SSDs that are active may be also taken into consideration wear leveling.

Figure 5A:
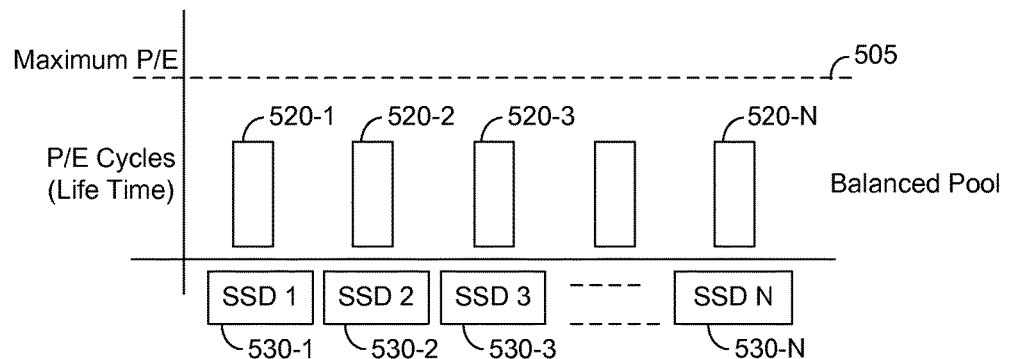
FIGS. 5A and 5B show wear leveling in a plurality of SSDs operating as a storage pool in accordance with an embodiment of the present invention.
Figure 5B:
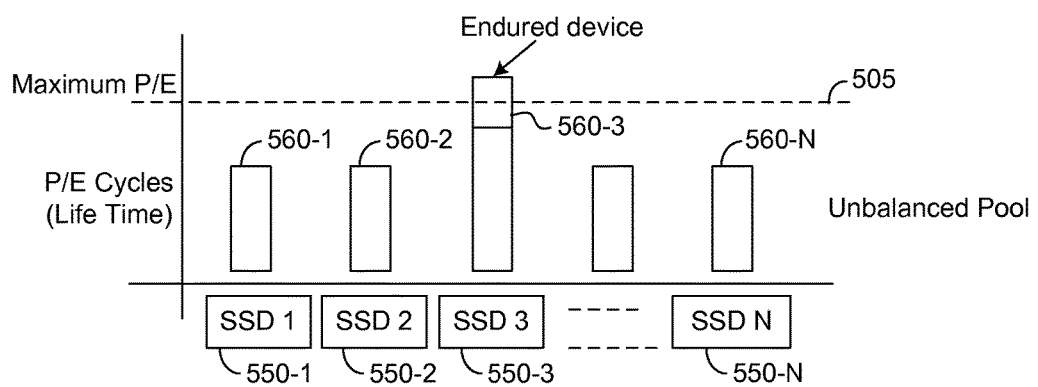

FIGS. 5A and 5B show a plurality of SSDs in a pool or storage array 300. The ideal state of the pool is shown in FIG. 5A, where all the SSD devices, 530-1 to 530-N have endured the same number of P/E cycles 520-1 to 520-N which is less than the maximum P/E cycle endurance 505. That is, the values 520-1 to 520-N are balanced to form a balanced pool having the same P/E cycle endurance or wear level.

FIG. 5B shows an unbalanced pool or storage array, where the SSD devices 560-a1-560-N have different endurance levels. Furthermore, device SSD3 550-3 has a higher endurance level 560-3, which is above the maximum P/E cycle endurance limit 505 of the device. As a result, device SSD3 550-3 may malfunction and have to be replaced by the administrator.

According to one embodiment of the invention, the P/E cycle endurance level of each SSD device is monitored. Decisions are made (e.g., by the host or the controller) to balance the workload such that pool P/E cycle wear level is averaged or leveled across all storage devices in the pool to a selected degree of accuracy.

A dynamic virtualization layer may be used to facilitate controlling garbage collection and balancing endurance. The dynamic virtualization may be provided at a host level or in the controller of the pool of SSD devices, depending on implementation.

Figure 6:
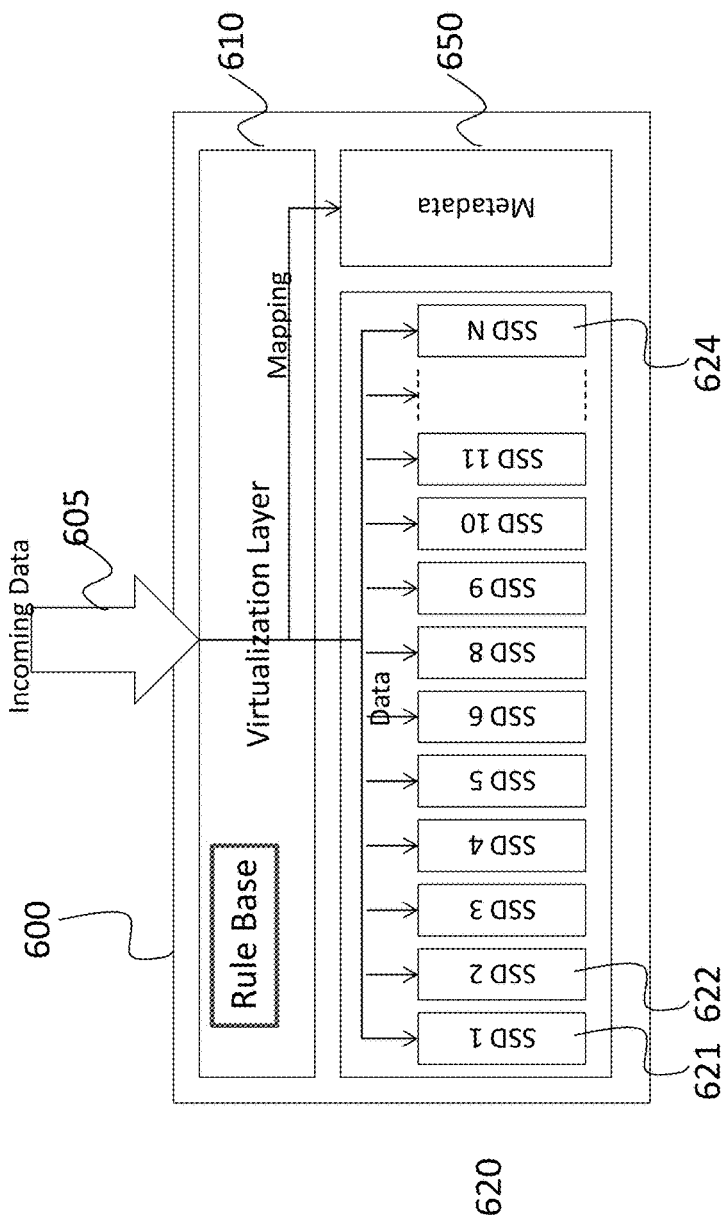
FIG. 6 illustrates an SSD pool architecture in accordance with an embodiment of the present invention.

FIG. 6 shows an example of a dynamic virtualization layer 610 in a storage server 600 accordance with an embodiment of the present invention. In one embodiment the virtualization layer includes a rule base and access to metadata 650. The virtualization layer 610 receives incoming commands 605 and maps them toward a pool of SSDs 620 (comprising individual SSDs 621, 622-624). This mapping uses metadata that holds the actual map between volume address to the physical location in a SSD (i.e., which SSD and what address in the SSD). The metadata can be stored in a non-volatile media such as NVRAM or battery backed DRAM.

The virtualization layer 610 supports switching SSD devices back and forth between an Active Mode and a Maintenance Mode. A dynamic mapping is required to account for the orchestration of SSD devices between Active Modes and Maintenance Modes. In contrast, conventional static virtualization techniques used for RAID arrays of disks uses a static 1:1 mapping scheme between logical block addresses (LBA) to physical disks.

Figure 7:
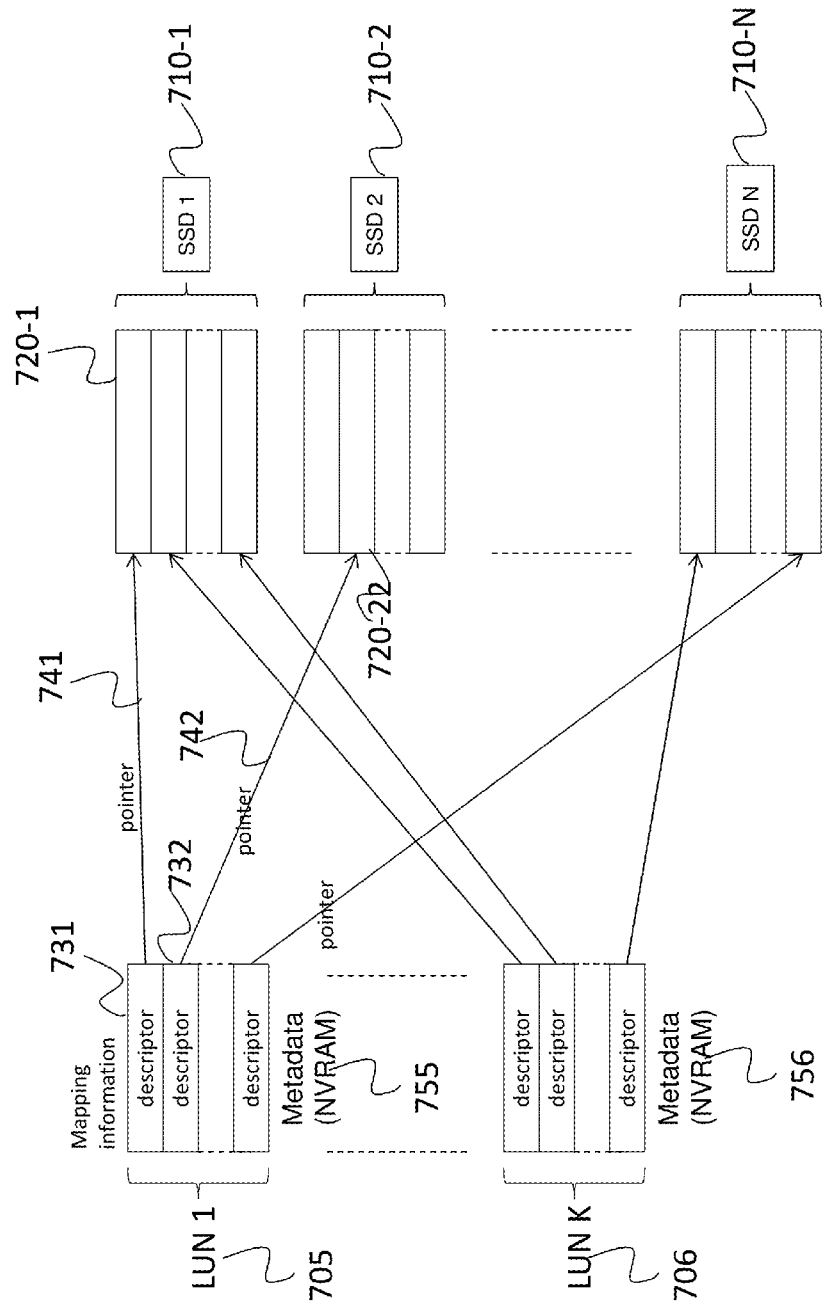
FIG. 7 is a diagram illustrating a dynamic virtualization layer for managing plurality of SSDs operating as a storage pool in accordance with an embodiment of the present invention.

An example of a dynamic mapping performed by the virtualization layer is illustrated in FIG. 7. The virtualization layer maps K virtual volume logical unit numbers (LUNs) 705-706 onto a pool of N SSDs 710-1, 710-2, to 710-N. The address space of the volumes and SSDs is segmented to fixed size chunks (e.g., 4K chunks). Each chunk in a virtual volume is mapped to a chunk in an SSD. Every virtual volume holds metadata that maps its chunks to the SSD. Hence, the metadata for each virtual volume is a set of descriptors (pointers) that map a chunk from the virtual volume to a chunk in an SSD.

As shown in FIG. 7, the first chunk in LUN 1 705 is stored in chunk 720-1 in SSD1 710-1 and pointed 741 to 721 by the first descriptor 731 in LUN 1 705 metadata 755. The second chunk of LUN 1 705 is pointed 742 by the second descriptor 732 to a chunk 720-22 in SSD2 710-2. According to one embodiment of the invention, any chunk in a virtual volume can reside on any SSD device in the pool.

Figure 8:
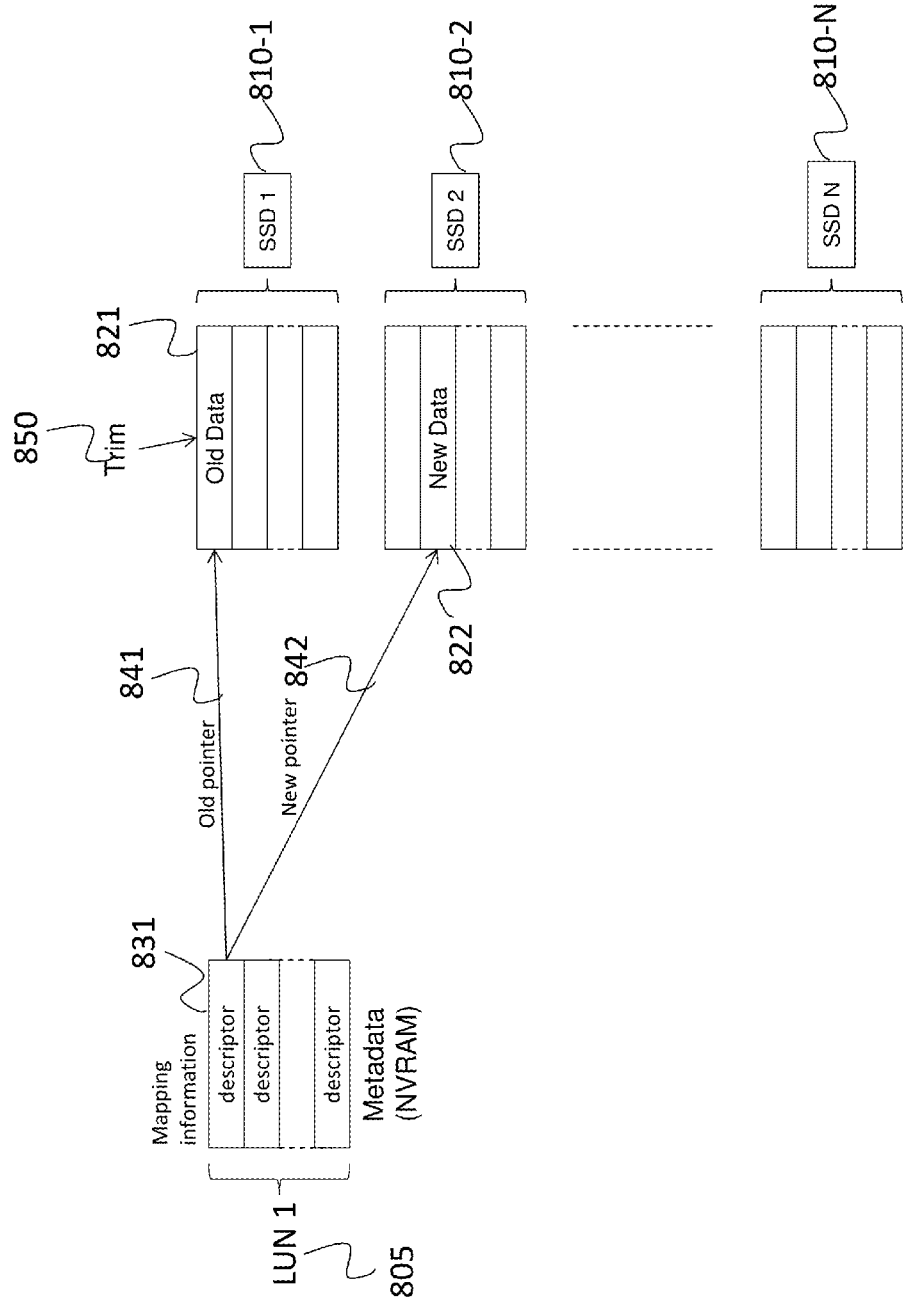
FIG. 8 is a diagram illustrating a writing process in the dynamic virtualization layer in a SSD storage pool management function in accordance with an embodiment of the present invention.

FIG. 8 shows the flow of new write command being handled by the virtualization layer. According to one embodiment of the invention, a chunk in LUN 805 is currently pointed 841 by its descriptor 831 to a location 821 in SSD1 810-1. When a new write command arrives to the same address segment denoted by this chunk, the virtualization layer can change the location of the chunk to a new location. In this case, the data will be written to the new location 822 (located in SSD2 810-2 in FIG. 8). The new pointer 842 will be set in the descriptor 831 and the old chunk space 821 will be trimmed 850 in the SSD. The 'trim' process is one where the host informs the SSD that a chunk (or chunks) are longer in use and can be safely erased to accommodate new data. This provides a dynamic mapping, where unlike RAID mapping, every LBA can be mapped in every device in the pool.

Figure 9:
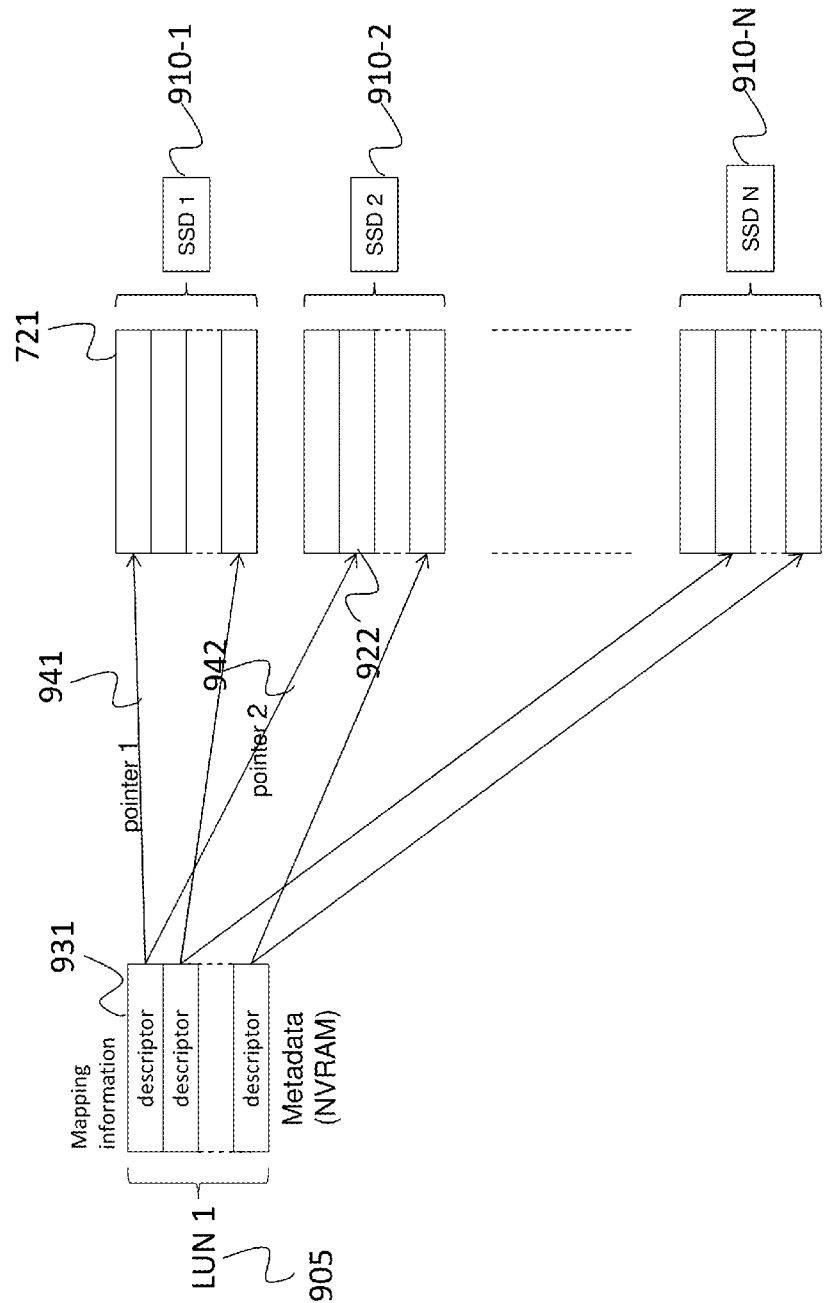
FIG. 9 is a diagram illustrating a mirroring operation in a dynamic virtualization layer in a SSD storage pool management function in accordance with an embodiment of the present invention.

FIG. 9 shows a dynamic virtualization layer operating with high availability. According to one embodiment of the invention, every chunk in the virtual volume 905 is mapped into two locations on two different SSDs from the pool or storage array SSD1, SSD2-SSDN 910-1, 910-2-910-N. As shown in FIG. 9, chunk 931 in the metadata mapping information is pointed 941 into chunk 921 in SSD1 910-1 and simultaneously pointed 942 into chunk 922 in SSD2 910-2.

The above dynamic virtualization layer defined the mapping scheme between virtual volumes and pool or storage array of SSDs. However, due to the dynamic mapping nature of the virtualization layer (unlike static mapping virtualization, e.g., RAID), there is a decision to make with each incoming read/write I/O command. Every write command requires a decision where to place the new data (allocate a chunk) while every read in a high availability configuration requires a decision from which (of the two) locations to read.

Figure 10:
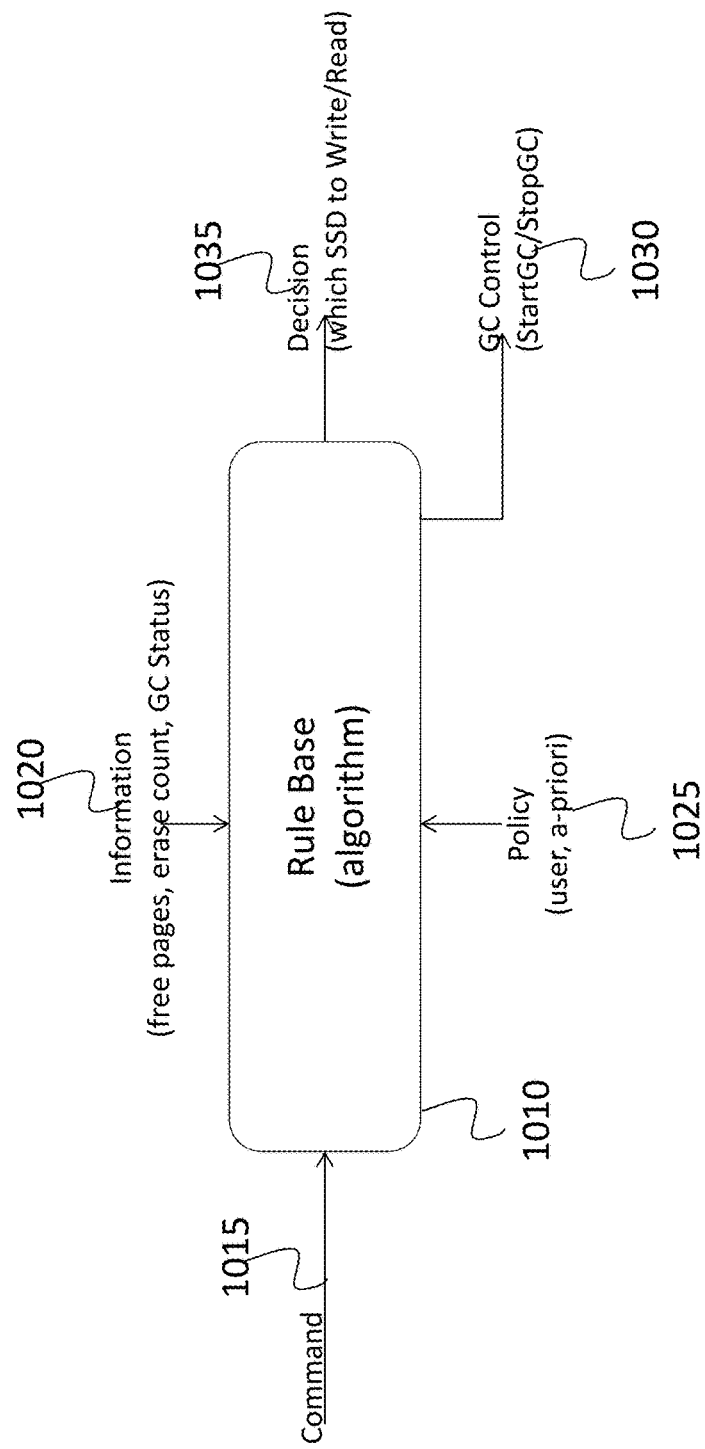
FIG. 10 is a diagram illustrating the inputs and outputs of a rule based garbage collection algorithm in accordance with an embodiment of the present invention.

As shown in FIG. 10, according to one embodiment of the invention, the virtualization layer includes a Rule Base 1010. The Rule Base 1010 receives incoming read/write I/O commands 1015, and makes decisions 1035 which SSD to read or write the new chunk. The Rule Base 1010 also makes decisions on activating/deactivating garbage collection 1030. The Rule Base 1010 may have a variety of information inputs 1020, such as the number of free pages and erase count in each SSD, and GC status. Additionally, the rule base 1020 may be provided a policy 1025 consisting of a user's directives or a-priori decisions to decide where to write the new chunk and how to activate garbage collection control. The following sections describe exemplary algorithms of the rule base.

Figure 11:
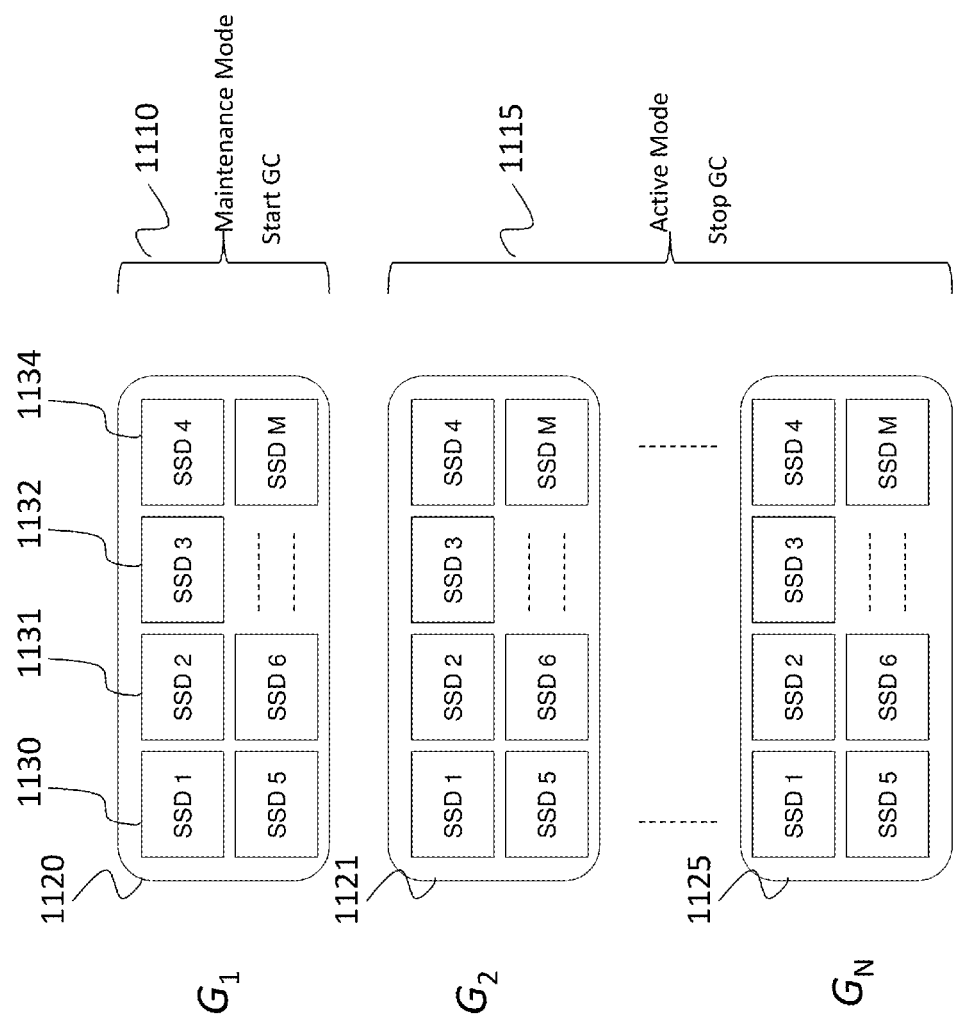
FIG. 11 is a diagram illustrating the grouping of SSDs in a SSD storage pool in accordance with an embodiment of the present invention.

As shown in FIG. 11, in one embodiment the rule base 1010 divides the SSDs in the pool to N equal groups, G1, G2-GN 1120, 1121-1125, such that N≥3. Each group contains M individual SSD devices 1130, 1131, 1132, 1134 etc. According to one embodiment of the invention, at any time, all the devices in one group will be in "Maintenance Mode" and the devices in the other groups will be in "Active Mode". Group G1 1110 is in "Maintenance Mode" and the remaining groups (G2 1115-GN 1125) are in "Active Mode."

According to another embodiment of the invention, the grouping algorithm can be implemented by an SSD controller inside the SSD.

Figure 12:
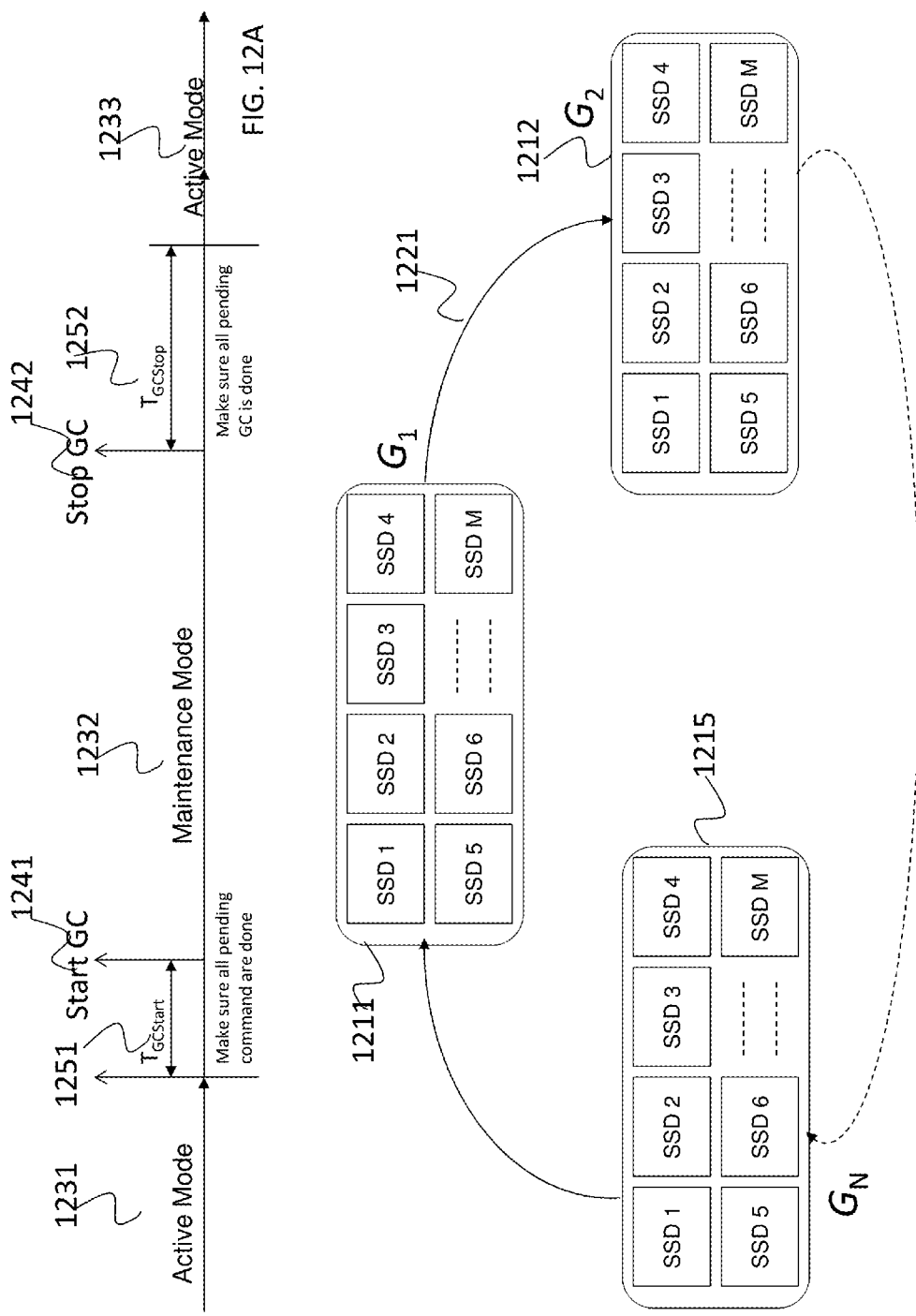
FIGS. 12A and 12B are diagrams illustrating a group transition between active and Maintenance Mode of pool level garbage collection in accordance with an embodiment of the present invention.

According to another embodiment of the invention, the groups periodically change their state, e.g., in a round robin way, such that after every period of time a different group will be in "Maintenance Mode". FIG. 12B shows the transition of the groups between states.

According to one embodiment of the invention, the trigger to the state movement of the groups is a pre-defined timeout.

According to another embodiment of the invention, the trigger to the state movement of the groups is a exceeding a threshold of the number of write commands to one of the groups.

According to another embodiment of the invention, the trigger to the state movement of the groups is the at least one of the above triggers.

Referring to FIG. 12A, according to another embodiment of the invention, when a group transitions from "Active Mode" 1231 to "Maintenance Mode" 1232 it waits for a period TGCstart 1251 until pending commands are processed and then issues a Start Garbage collection command 1241. According to another embodiment of the invention, when a group transitions from "Maintenance Mode" 1232 to "Active Mode" 1233, it issues a Stop Garbage Collection command 1242 and then waits for a period TGCstop 1252 before the transition to ensure all pending garbage collection has completed.

According to one embodiment of the invention, if data associated with an incoming read command resides in two SSDs—one in "Active Mode" and one in "Maintenance Mode", it will be read from the one in "Active Mode."

According to another embodiment of the invention, if data associated with an incoming read command resides in two SSDs—both in "Active Mode", it will be read from one of them—either at random selection or other alternative method.

According to one embodiment of the invention, when an incoming write command arrives, it will be directed to two SSDs (for high availability), where each one is in a different group in "Active Mode."

As there are always two or more groups in "Active Mode", incoming commands are always read from or written to an SSD in "Active Mode". Hence, they are served from an SSD having no garbage collection proceeding in the background and therefore will be served with the maximal performance.

According to another embodiment of the invention, each SSD controller supports read priority. In read priority, the Read commands are served before queued Write commands. In one embodiment Read commands can be served from a group in "Maintenance Mode." In this case, when an incoming write command arrives, it will be directed to one SSD in "Active Mode" if High Availability is not required.

Figure 13:
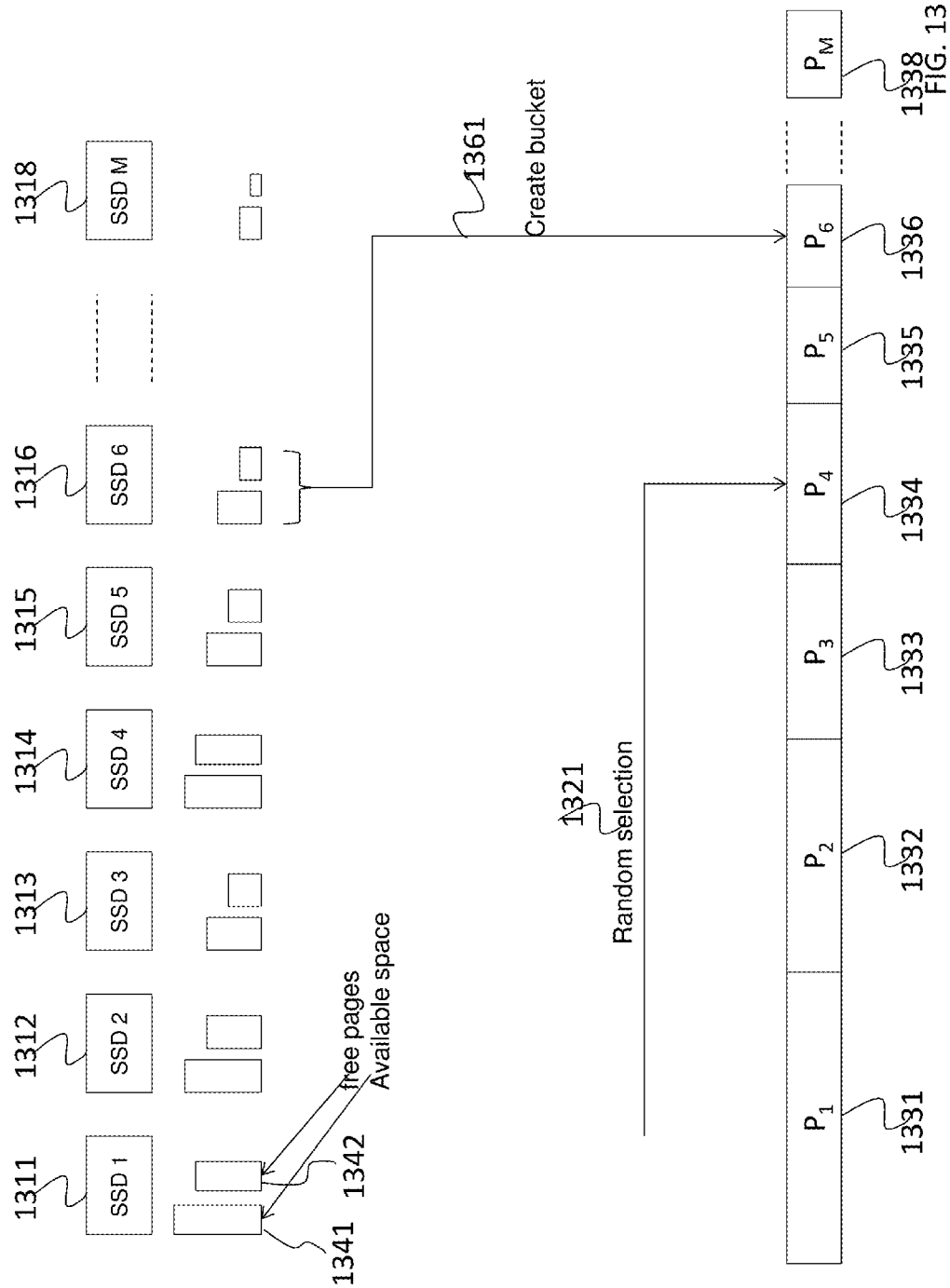
FIG. 13 is a diagram illustrating the algorithm of SSD selection in storage for an incoming control command in accordance with an embodiment of the present invention.

FIG. 13 shows a schematic of an algorithm for selecting which SSD to write in a group of M SSDs 1311-1318. According to one embodiment of the invention, the host selects at random an SSD, where the probability for selecting an SSD is based on its free pages and available space.

As shown in FIG. 13, according to one embodiment of the invention, the number of free pages 1341 and available space (total SSD capacity−capacity consumed by User Data) 1342 are formed 1361 to define the probability P_i for SSDi:

$$Pi = w1 \cdot \text{free pages} + w2 \cdot \text{available space}$$

Where w1 and w2 are pre-configured weights.

According to another embodiment of the invention, after normalizing the probabilities the host selects at random 1321 an SSD, weighted according to the devices' probabilities. The write command in this group will be the selected SSD.

According to another embodiment of the invention, the probabilities are normalized by the device endurance level. Such that:

$$P'\_i = P\_i / \text{age, where age is a function of device endurance.}$$

Figure 14:
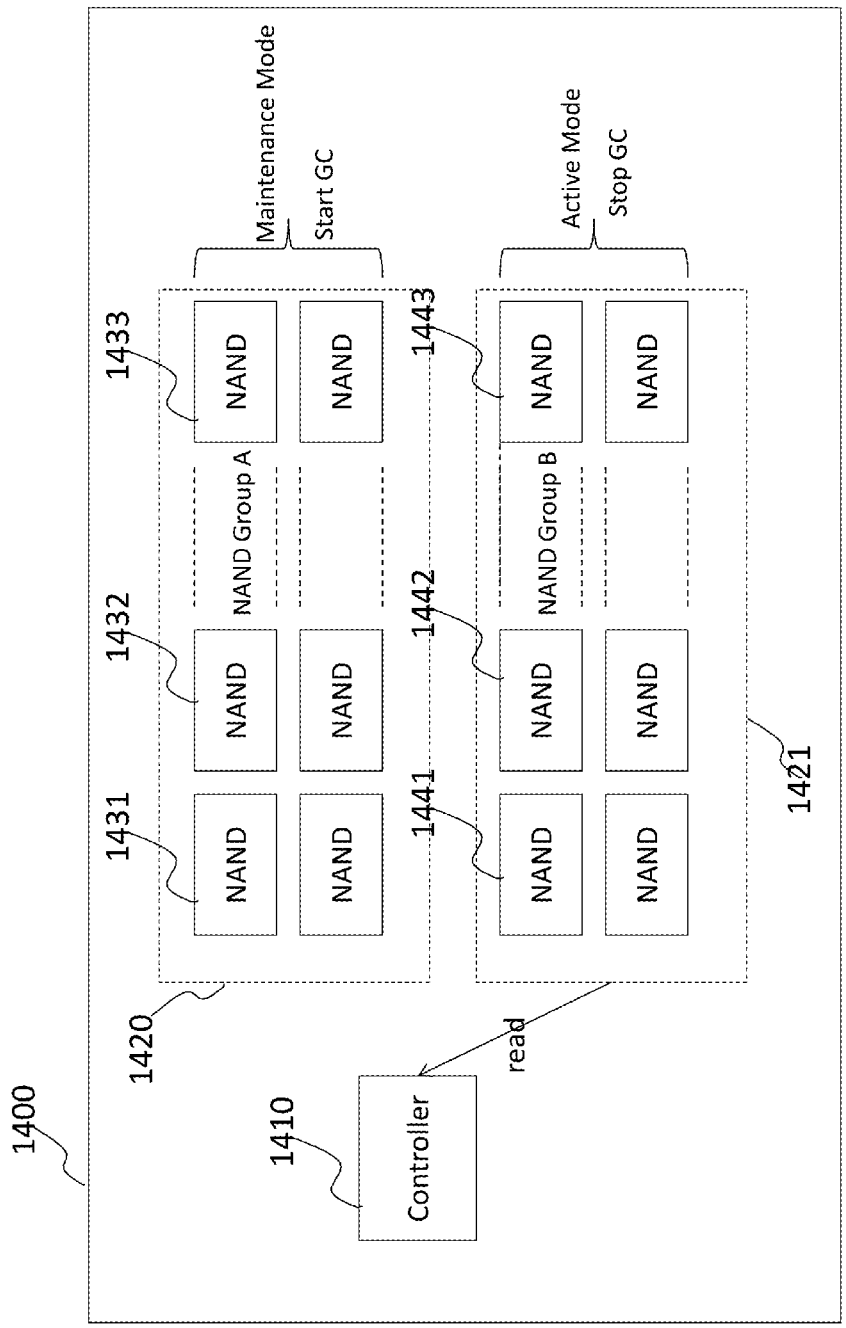
FIG. 14 is a diagram illustrating the grouping concept of a single SSD within a storage pool in accordance with an embodiment of the present invention.

As shown in FIG. 14, an SSD controller 1410 manages a plurality of NAND devices within the SSD 1400. The controller 1410 segments the NAND devices into two groups, 1420 and 1421. Within group 1420 reside multiple NAND flash devices 1431, 1432, 1433 and within group 1421 reside NAND flash devices 1441, 1442 and 1443. While group 1420 is in Maintenance Mode, it performs garbage collection operation and all read commands are fetched from group 1421 (in Active Mode). After some time period, group 1420 shifts to Active Mode, serving read commands and group 1421 shifts to Maintenance Mode, performing garbage collection.

According to another embodiment of the invention, the same generality as described for plurality of SSDs applies to operation of multiple groups (i.e., N groups), each containing a plurality of NAND flash devices within a single SSD—where some groups are in Active Mode and some in Maintenance Mode.

In one embodiment of a RAID implementation in which there is redundant storage of data, the controller provides improved error detection by combining data from two SSD devices. For improved error detection, the SSD controller combines the data from the two SSD device:
- for each data bit if both SSD devices give the same value, then this value is used in the combination
- if both elements give different results, the number of 1s and 0s will be used to select which value to select (assumes that number of 1s and 0s are 50%—so for example if one of the elements has 60% 1s, then if it has a value of 1 but the other element has a 0 then the resulting bit will be 0.

While the invention has been described in conjunction with specific embodiments, it will be understood that it is not intended to limit the invention to the described embodiments. On the contrary, it is intended to cover alternatives, modifications, and equivalents as may be included within the spirit and scope of the invention as defined by the appended claims. The present invention may be practiced without some or all of these specific details. In addition, well known features may not have been described in detail to avoid unnecessarily obscuring the invention. In accordance with the present invention, the components, process steps, and/or data structures may be implemented using various types of operating systems, programming languages, computing platforms, computer programs, and/or computing devices. In addition, those of ordinary skill in the art will recognize that devices such as hardwired devices, field programmable gate arrays (FPGAs), application specific integrated circuits (ASICs), or the like, may also be used without departing from the scope and spirit of the inventive concepts disclosed herein. The present invention may also be tangibly embodied as a set of computer instructions stored on a computer readable medium, such as a memory device.

What is claimed is:

1. A storage system, comprising:
    a plurality of solid state drive (SSD) devices;
    an interface to communicate with a host computer;
    each SSD device configured to respond to garbage collection control commands to stop and start garbage collection operations and provide information on the amount of free pages in response to a free page status request; and each SSD device configured to respond to provide wear level information to monitor the endurance level of each SSD device;

wherein the storage system is configured to manage the operation of the plurality of SSD devices so that each individual SSD device has an Active Mode in which all host read/write commands are processed and a Maintenance Mode in which a limited subset of host read/write commands are processed and garbage collection operations are performed and wherein the operation of the plurality of SSD devices is managed to balance endurance over all of the SSD devices.

2. The storage system of claim 1, wherein in the Maintenance Mode the limited subset of host read/write commands is a null subset in which no read commands and no write commands are processed.

3. The storage system of claim 1, wherein in the Maintenance Mode the limited subset of host read/write commands is a subset in which read commands are processed but write commands are not processed.

4. The storage system of claim 1, wherein in the Maintenance Mode the limited subset of host read/write commands is a subset that limits one of a number, a frequency, and a combination of number and frequency of read and write commands to be processed.

5. The storage system of claim 1, wherein in the Maintenance Mode a read priority in enforced in which read commands are served before queued write commands.

6. The storage system of claim 1, wherein a virtualization layer receives incoming commands from the host computer and dynamically maps the incoming commands by virtual volume addresses to physical locations in the pool of SSD devices.

7. The storage system of claim 6, wherein the plurality of SSD devices is divided into a set of groups in which all of the members of an individual group are operated in either an Active Mode or in a Maintenance Mode.

8. The storage system of claim 7, where the mode of the set of groups is switched by one of a round robin mode, triggered by timeout, and a data write threshold.

9. The storage system of claim 7, where a decision to which SSD device in a group to write is made at least in part based on free pages values of each of the plurality of SSD devices.

10. The storage system of claim 7, where a decision to which SSD device in a group to write is based at least in part on the endurance level of the SSD device and a wear level balancing criteria.

11. The storage system of claim 1 wherein the storage system is a storage appliance and an SSD controller manages the operation of the pool of SSD devices.

12. The storage system of claim 1, wherein the storage system is a storage server and an SSD controller manages the operation of the plurality of SSD devices.

13. The storage system of claim 1, wherein the plurality of SSD devices is a pool of SSD NAND devices.

14. A system, comprising:
a plurality of solid state drive (SSD) devices organized into a pool of SSD devices;
an interface to communicate with at least one host computer;
a virtualization layer to receive incoming commands from the host computer and dynamically map the incoming commands by virtual volume addresses to physical locations in the pool of SSD devices;
wherein the system is configured to coordinate the operation of the pool of SSD devices so that each individual SSD device has an Active Mode in which all host read/write commands are processed and a Maintenance Mode in which a limited subset of host read/write commands are processed and garbage collection operations are performed and wherein the operation of the pool of SSD devices is managed to balance endurance over all of the SSD devices.

15. The system of claim 14, wherein in the Maintenance Mode the limited subset of host read/write commands is a null subset in which no read commands and no write commands are processed.

16. The system of claim 14, wherein in the Maintenance Mode the limited subset of host read/write commands is a subset in which read commands are processed but write commands are not processed.

17. The system of claim 14, wherein in the Maintenance Mode the limited subset of host read/write commands is a subset that limits one of a number, a frequency, and a combination of number and frequency of read and write commands to be processed.

18. The system of claim 14, wherein in the Maintenance Mode a read priority in enforced in which read commands are served before queued write commands.

19. The system of claim 14 wherein the virtualization layer maps K virtual volume logical unit numbers (LUNs) onto a pool of N SSD devices.

20. The system of claim 19 wherein the address space of virtual volumes are segmented into chunks and each chunk in a virtual volume is mapped to a chunk in SSD device.

21. The system of claim 20, wherein each virtual volume holds metadata that is a set of descriptors that maps a chunk from the virtual volume to chunk in an SSD.

22. The system of claim 20, further comprising high availability in which every chunk in a virtual volume mapped into two locations on two different SSDs from the pool or storage array.

23. The system of claim 14, wherein an individual SSD device for handling a write commands is selected at random, with the probability for selecting an SSD device is based on a free page count of the SSD device and available space in the SSD device.

24. The system of claim 14, wherein an individual SSD device selected to handle a write commands normalized by an device endurance level.

25. The system of claim 14, wherein the plurality of SSD devices is divided into a set of groups in which all of the members of an individual group are operated in either an Active Mode or in a Maintenance Mode.

26. The system of claim 21, further comprising performing error detection by combining data from the two locations to identify valid data.

27. The system of claim 26, wherein correct values have an approximately equal number of zeros and ones in a binary representation, the method further comprising:
if both elements give the same value, using the same value as a correct value; and
if both elements give different results, determining the number of binary 1s and 0s in each result, and selecting the value having the number of 1s and 0s closest to 50%.

28. The system of claim 14, wherein the plurality of SSDs are organized into mirrored pairs operated in a RAID mode, wherein in each mirrored pair at least one SSD of the pair is operating in Active Mode if the other SSD of the mirrored pair is operated in Maintenance Mode.

29. The system of claim 14, wherein the plurality of SSDs are organized into mirrored pairs operated in a RAID mode, wherein in each mirrored pair operating both SSDs of the mirrored simultaneously in the Maintenance Mode is prohibited.

30. The system of claim 14, wherein only each mirrored pair may only be operated with either 1) both members of the mirrored pair active; or 2) one member of the pair in an Active Mode and the other member of the pair operated in the Maintenance Mode.

31. The system of claim 28, wherein for a data read operation data is read from an SSD operating in the Active Mode.

32. The system of claim 31, wherein for a data write operation with a first member of the pair in an Active Mode and the second member of the pair in a Maintenance Mode, the data is first written to first SSD in the Active Mode and a write to the second SSD is delayed until the second SSD resumes operation in the Active Mode.

33. The system of claim 14, wherein in an erasure coding mode, a data object to be stored is encoded and split into n chunks and written into n SSDs, where n is a positive integer.

34. The system of claim 33, wherein erasure decoding requires a minimum of k chunks, where k<n, and at any one time in the erasure coding mode, a maximum of n−k SSDs are operated in the Maintenance Mode such that at least k SSD are in the Active Mode.

35. The system of claim 33, wherein the writing of any of the n SSDs is Maintenance Mode is delayed until the SSD returns to the Active Mode.

36. A method of operating a set of solid state drives (SSDs), comprising:

operating each SSD in either an Active Mode or in a Maintenance Mode, wherein the Active Mode is a mode in which host read/write commands are processed and the Maintenance Mode is mode in which a limited subset of host read/write commands are processed and garbage collection operations are performed;

monitoring free pages, erase count, and garbage collection status of the set of SSDs;

varying, over time, a selection of Active Mode SSDs and Maintenance Mode SSDs based at least in part on the monitored free pages, erase count, and garbage collection status;

in response to a read/write request, selecting at least one SSD to perform the read/write request; and performing a dynamic mapping to map the read/write request to the selected at least one SSD.

* * * * *